Oct. 16, 1962 W. W. JETTER 3,059,170
WELDING SYSTEM USING ADJUSTABLE CURRENT TRANSFORMER
Filed Oct. 16, 1959 4 Sheets-Sheet 1

INVENTOR.
WILLIAM W. JETTER
BY
Kegan, Bellamy & Kegan
ATTORNEYS

INVENTOR.
WILLIAM W. JETTER
BY
Kegan, Bellamy & Kegan
ATTORNEYS

Oct. 16, 1962 W. W. JETTER 3,059,170
WELDING SYSTEM USING ADJUSTABLE CURRENT TRANSFORMER
Filed Oct. 16, 1959 4 Sheets-Sheet 3

INVENTOR.
WILLIAM W. JETTER
BY
Kegan, Bellamy & Kegan
ATTORNEYS

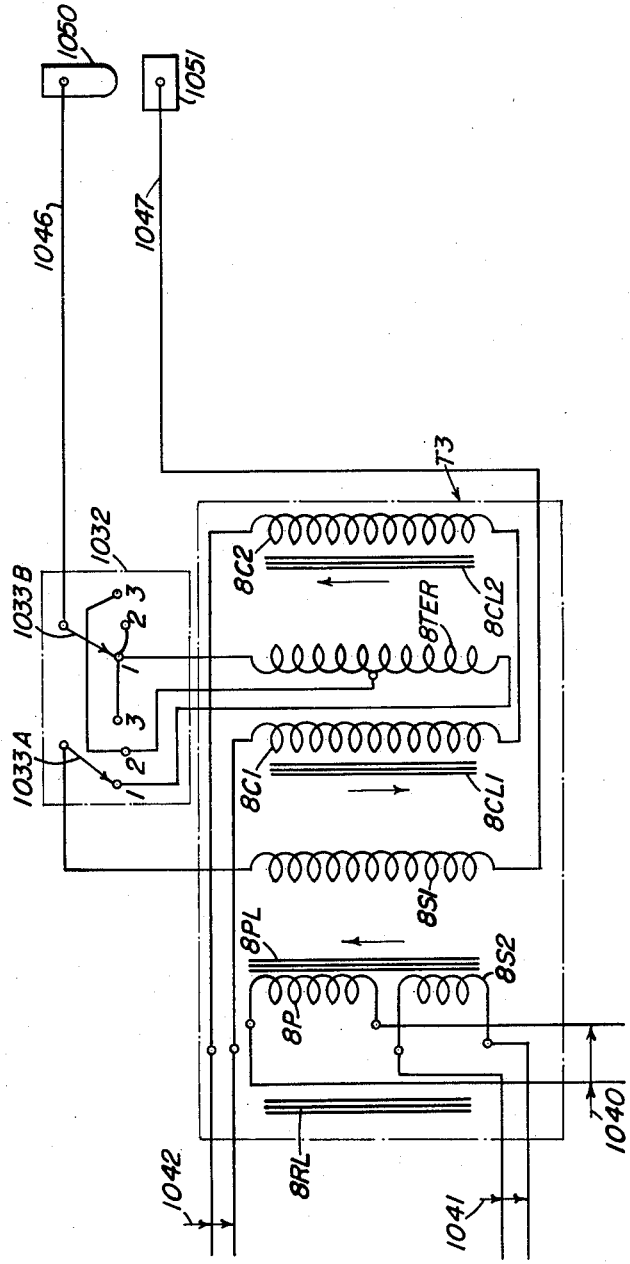

United States Patent Office 3,059,170
Patented Oct. 16, 1962

3,059,170
WELDING SYSTEM USING ADJUSTABLE
CURRENT TRANSFORMER
William W. Jetter, Riverside, Ill., assignor to Mid-States
Welder Manufacturing Co., a corporation of Illinois
Filed Oct. 16, 1959, Ser. No. 846,837
19 Claims. (Cl. 323—56)

My invention relates to welding systems employing transformers, being concerned more particularly with those wherein the transformer has a generally fixed open-circuit voltage and is adjustable to regulate its output of current to the desired welding value over a comparatively wide range of welding-current values.

The main object is to provide a welding system employing a transformer which is readily preadjustable from time to time to limit its output of welding current to such values as may be desired from time to time, according to the size or character of the articles to be welded and the nature of the weld desired.

This application is a continuation in part of my application Serial No. 757,238, filed August 26, 1958, for an Adjustable Constant-Current Transformer and System.

Referring particularly to arc welding, the leads extending from the secondary winding of the welding transformer are brought together through welding electrodes to draw current through an article to be welded, following which one electrode is withdrawn to strike an arc which is maintained during the welding operation, the heat of the arc causing welding to occur. The nature of an article to be welded and the nature of the weld desired dictate the amount of heat to be applied and consequently largely dictate the amount of current required or permissible to accomplish the welding operation efficiently and without injury to the welded article. Such articles may range from small and delicate parts admitting of only a small amount of heat, to large parts requiring a relatively large amount of heat. The current flow from the secondary winding of the transformer must thus be adjustable over a wide range, but the open-circuit voltage must remain generally fixed, at a value at least sufficient to maintain the welding arc.

Heretofore, welding systems have been produced using transformers of the adjustable constant-current type, but they have for the most part required the physical adjustment of air gaps in shunt or control arms of the transformer core, the physical requirements of which have caused them to be somewhat expensive, bulky, and difficult of adjustment. Prior examples of transformers of this type are disclosed in Patents 2,411,370 and 2,437,021.

More recently, as in Patent 2,591,582, a modification of the transformer arrangement disclosed in the noted patents has been proposed wherein the reluctance of the shunt or control arms of the transformer has been adjusted by the passage of a desired amount of direct current through control windings thereof, in an attempt to provide a structure rendering unnecessary the physical adjustment of air gaps in the control or shunt arms of the transformer. For the most part, such proposals have been open to the objection that the resulting transformer structure is inefficient, that the transformer operation is seriously hampered by undesired intercoupling between the alternating-current and direct-current portions of the circuit path, and that only a small useful control range is obtained.

According to the invention, the foregoing disadvantages are overcome by providing a welding system employing a welding transformer which employs a number of interconnected core legs comprising at least one primary leg and at least one pair of control legs, with a secondary winding which, in the preferred illustrative embodiment, encircles the primary leg and both control legs, together with separate direct-current energizable windings on the control legs. Further according to the invention, the control windings are so interconnected, in opposing relationship, within the direct-current control circuit that the alternating potential induced by flux passing through either such winding is neutralized within the control circuit by the equal and opposite potential induced by the simultaneous passage of alternating flux in the opposite direction through the other control winding, and the core portions of the transformer structure are so interrelated and arranged that the direct-current control flux generated in the control legs by the direct current through the control windings is substantially entirely excluded from the primary leg of the transformer, to thus substantially entirely eliminate any tendency toward saturation thereof.

Still further according to the invention, the controlling effect exercised by the adjusted value of the direct current flowing through the control windings is greatly increased in effect by surrounding the control legs of the transformer with a tertiary winding. In one embodiment, the tertiary winding acts primarily as a choke winding, the choking effect of which is also adjustable according to the value of the flow of current through the direct-current control windings. By providing a range switch which selectively includes none, part, or all of the noted choke winding in series with the welding load, a number of adjustable ranges are provided in welding current, which permits any desired value of welding current from extremely small to very large to be taken from the same welding transformer. In second and third embodiments, the tertiary winding acts primarily with the secondary winding in controlling the amount of non-linkage, or de-coupling, flux which passes through the control legs responsive to secondary, or welding-current, flow.

The above mentioned and other objects and features of this invention and the manner of obtaining them will become more apparent, and the invention itself will be better understood, by reference to the following description of an embodiment of the invention taken in conjunction with the accompanying drawings comprising FIGS. 1 to 10, wherein:

FIG. 1 discloses a top view of a welding transformer T1 suitable for use in the improved welding system;

FIG. 11 shows a switching modification of the welding system shown in FIG. 10.

*FIGS. 1 to 4—Transformer T1*

Figure 1:
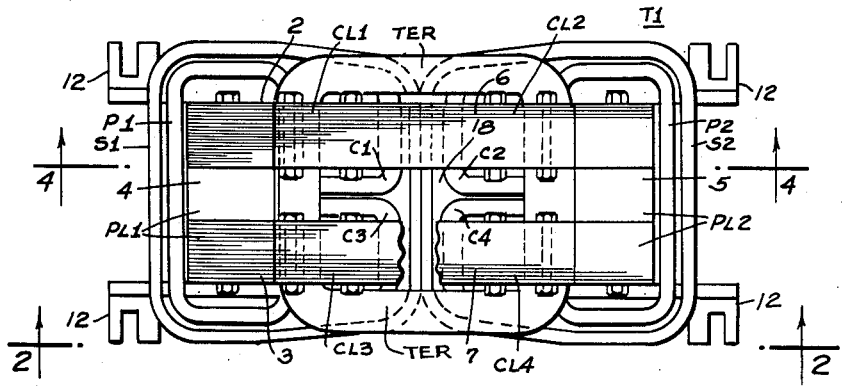

Referring to FIGS. 1 to 4, transformer T1 illustrated therein comprises a closed-circuit laminated-core structure provided with the illustrated windings. The core structure is supported on the four foot strips 12 and is preferably arranged for a forced draft of air to be passed through the open parts of the structure for cooling purposes, particularly when heavy welding currents are being drawn.

Transformer T1 comprises similar upright primary legs PL1 and PL2 at the ends of the core structure, the ends of which legs are magnetically joined by the illustrated upper pair and lower pair of horizontal magnetic return bars, between which are a rear pair of upright control legs CL1 and CL2, and a front pair of upright control legs CL3 and CL4. The laminated core structure of T1 is divided into a rear portion 2, 6 and a front portion 3, 7 by upright laminated spacing structures 4 and 5, which provide a central shaft-like space 18 (FIGS. 1 and 3) to provide room for the control windings around the four control legs CL1 to CL4 and also to provide a ventilating space for cooling air to be passed through the core structure.

Three sides of the ladder-like front portion 3, 7 of the laminated structure are made up of a stack of similar laminations which comprises the front portion of the upright primary legs PL1 and PL2, and the lower half of the control legs CL1 and CL2. The top side of the front portion is the laminated structure 7, which comprises the front horizontal upper connecting leg between PL1 and PL2, together with the upper half of the front control legs CL3 and CL4. Similarly, the ladder-like rear portion of the laminated structure comprises assemblies 2 and 6 which are respectively similar to front assemblies 3 and 7.

In assembling the structure of FIGS. 1 to 4, the base structure may first be assembled. It comprises the laminated assemblies 2, 3, 4, and 5, bolted together without core structures 6 and 7. Through bolts 8 and relatively short bolts 10 are employed to secure assemblies 2 to 5 with each other and with foot strips 12. Through bolts 9, having thin heads and thin attaching nuts, are employed at the center portion of legs PL1 and PL2. The two upper bolts 8 may be omitted until the coils have been assembled with the structure.

The illustrated power coils may next be assembled with the noted base structure comprising local secondary coil S3, on the left primary leg PL1; primary coils P1 and P2, which closely surround the respective primary legs PL1 and PL2; and secondary coils S1 and S2, each of which surrounds a separate primary leg and the two adjacent control legs.

The four control windings C1 to C4 may next be assembled with the lower portion of the control legs CL1 to CL4, carried on the base structure, each such control winding rather closely surrounding its associated control leg but outwardly spaced front and rear sufficiently to pass over the short bolts 11, which are provided with relatively thin heads and nuts for that purpose.

Tertiary winding TER may now be placed on top of the other windings, in position to be in encircling relationship with all four of the control legs CL1 to CL4 when assembly of the structure is completed.

Laminated structures 6 and 7, each of which preferably has the same lamination thickness as do assemblies 2 and 3, are held together by bolts 11 within legs CL1 and CL2 (provided with thin bolt heads and nuts), and by bolts 10 within the top horizontal portion of each structure. Each of the assembled structures 6 and 7 may next be lowered into place from the top. Their dimensions are such that a relatively close fit results, and the parts may be brought down into final assembled position by the use of a mallet. The resulting structure provides a very close magnetic union with the inner face of the upper end of legs PL1 and PL2. Preferably, however, a slight air gap, as of perhaps .010 inch, is provided at each of the four central locations 15 in legs CL1 to CL4. These air gaps may be insured by placing a non-magnetic spacer, as of a hard plastic sheet of desired thickness, at each of the gap locations 15.

In FIGS. 1 to 4, the winding leads representing the terminals of the illustrated windings have been omitted to avoid obscuring the other parts of the drawing, and no terminals for these leads and for interconnecting them with external circuit conductors have been illustrated as attached to the core structure, since such terminals and leads may be provided in any well-known or desired manner.

Figure 5:
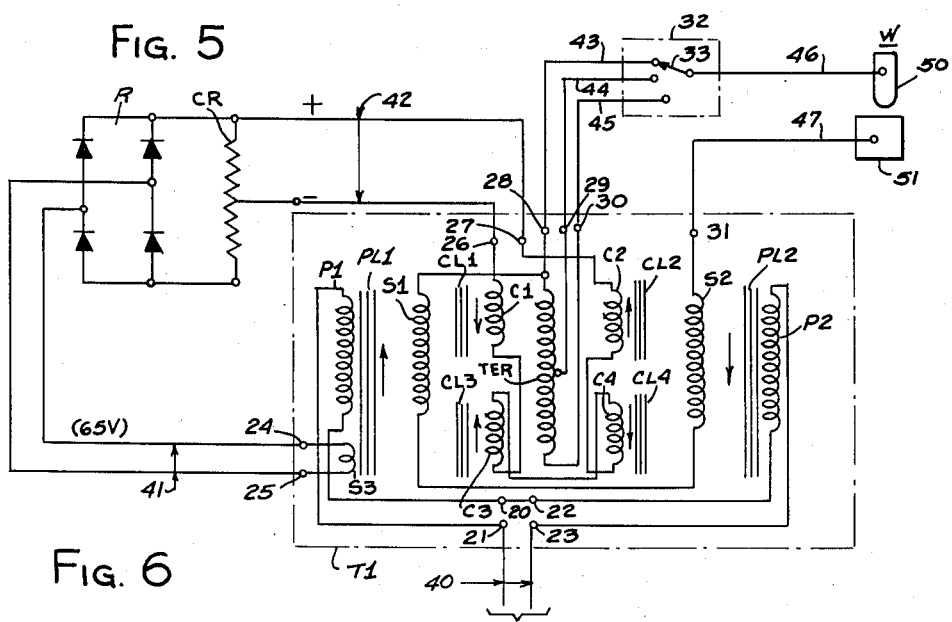
FIG. 5 shows in circuit diagram a welding system incorporating transformer T1 of FIGS. 1 to 4.

FIG. 5—The Welding System

FIG. 5 shows in circuit diagram a preferred form of welding system employing the transformer T1 of FIGS. 1 to 4, which is indicated in FIG. 5 by the apparatus within the broken-line rectangle T1. Terminals 20 to 31 are shown for T1 through which the windings are connected with each other and with the illustrated external circuit conductors.

In FIG. 5, the two primary windings P1 and P2 of FIGS. 1 to 4 are shown interconnected in series with each other and supplied with current over conductors 40 from a 440-volt 60-cycle current source. The connections at terminals 20 to 23 may be changed from series to parallel in the usual manner for 220-volt excitation over conductors 40. Windings P1 and P2 are shown adjacent the conventional showing of primary legs PL1 and PL2 as an indication of the encircling relationship therewith. Secondary windings S1 and S2 are shown connected in series with each other between terminals 28 and 31 to provide a combined output voltage equal to twice the voltage of either winding. Winding S1 is shown in FIG. 5 between primary leg PL1 and the control legs CL1 and CL3 as an indication of the inductive relationship shown in FIGS. 1 to 4 wherein winding S1 encircles all three of the legs PL1, CL1, and CL3. Winding S2 is similarly shown with respect to legs PL2, CL2, and CL4 since it encircles these three legs. Control windings C1 to C4 are shown respectively adjacent the indications of control legs CL1 to CL4, as an indication that each such control winding encircles only its own locally associated control leg. Tertiary winding TER is shown similarly related to each of the control legs CL1 to CL4 since TER encircles all four of the control legs, as shown in FIGS. 1 to 4. Secondary winding S3 is shown below winding P1 in FIG. 5 since it also surrounds only primary leg PL1.

As shown in FIG. 5, the respective conductors 40 are connected through 21, 23 to the upper terminals of windings P1, and the lower terminals of these windings are connected together through 20, 22, which causes windings P1 and P2 to be energized in opposing relationship. That is, during a given one-half cycle of current from conductors 40, flux is thus induced upwardly in PL1 and downwardly in PL2, with the opposite condition obtaining during the the next succeeding half cycle. Primary-induced flux in legs PL1 and PL2 is thus serially linked through these two legs and the horizontal connecting portions of the core structure. The legs PL1 and PL2 are thus in series-aiding flux relationship, wherefore there is no particular tendency for alternating flux to flow through control legs CL1 to CL4 in the absence of current through the secondary windings S1 and S2. The magnetic neutral point of the structure from the standpoint of flux resulting from primary excitation is at about the central portion of the upper and lower horizontal connecting bars, between the left control legs CL1, CL3 and the right control legs CL2, CL4. Consequently, with no welding current being drawn, the magnetic linkage between the primary and secondary windings (from P1 to S1 and from P2 to S2) is substantially the same as though each secondary winding encircled only the associated primary leg and winding.

The lower terminals of the secondary windings S1 and S2 are joined together, and the upper terminals of these windings are brought out (at terminals 28 and 31) to furnish current over conductors 46 and 47 to the welder W, illustrated as a lower electrode 51 and an upper electrode 50. Electrode 50 is the movable electrode, and it commonly contains such welding-flux material as may be needed to enhance the welding operation.

*High Range—40 to 500 Amperes*

Range switch 32 is provided to connect conductor 46 with any desired one of the three output conductors 43 to 45. With range switch 32 in its illustrated position (connecting conductor 46, through switch member 33, with conductor 43), the welding system is set for the highest range of welding currents, up to 500 amperes, for example, in that tertiary TER is entirely by-passed. The low point in this range is with the controller CR set with its arm in uppermost position, to supply substantially zero current to control windings C1 to C4. Under that condition, the control windings offer no retardation to the free passage of alternating current flux through control legs CL1 to CL4. Then, when the welding circuit is closed over conductors 43, 46, and by way of electrodes 50 and 51 and return conductor 47, the resulting starting current flowing in the welding circuit, from secondary windings S1 and S2 in series, causes a substantial reduction of voltage to occur at each secondary winding, in that each secondary winding induces a substantial reversely directed, or neutralizing, flux through the two control legs which it encircles. For example, considering a half cycle when the primary flux is upwardly in leg PL1 as indicated by the arrow thereat in FIG. 5 (and is then downwardly in leg PL2), the effect of the resulting induced current in secondary winding S1 is to tend to pass flux downwardly through the legs PL1, CL1, and CL3 encircled by winding S1. This effect is overcome in leg PL1 by the current flowing through primary winding P1, but the effect is manifest in control legs CL1 and CL3 by causing flux to flow downwardly through both of these control legs, thus neutralizing the effect in winding S1 of a corresponding amount of the flux induced by P1 in PL1. At the same time, the indicated downward flux in primary leg PL2 is accompanied by the flow of the welding current in secondary winding S2 (in series with S1) in such a direction as to tend to cause flux to pass upwardly through the legs PL2, CL2, and CL4 encircled by secondary winding S2. Primary winding P2 nullifies the noted effect in leg PL2, but substantial flux flows downwardly through CL2 and CL4 to neutralize the effect on winding S2 of a corresponding amount of the flux induced in PL2 by winding P2.

On the next half cycle, the voltage reducing action is the same except that the flux directions are reversed obedient to the reversal of current in windings P1 and P2.

In the illustrated structure and system, with no current through control windings C1 to C4, the noted neutralizing flux action through CL1 and CL3 for winding S1, and through CL2 and CL4 for winding S2, limits the maximum welding current flow over conductors 46 and 47 to perhaps 40 amperes, the low point in the noted illustrative hig-range setting of switch 32.

As shown in FIG. 5, the secondary winding S3, on leg PL1, supplies current through terminals 24 and 25 and over leads 41, through full-wave rectifiers R to provide a potential of about 65 volts D.C. across controller CR. The upper terminal of controller CR is connected by way of the positive one of the two conductors 42 to terminal 27 of T1, while the slider of controller CR is connected by way of the negative one of the conductors 42 to terminal 26 of T1. Terminals 26 and 27 are connected together in T1 through windings C2, C4, C3, and C1 in series. These windings are so interconnected directionally, as shown, that direct-current flux is induced in opposite directions in legs CL1 and CL3, such flux agreeing respectively in CL4 and CL2 with its directions in CL1 and CL3. Specifically, the direction of direct-current flux, with the illustrated polarity, is down in the diagonally opposed legs CL1 and CL4, and is up in the other diagonally opposed legs CL2 and CL3.

The amount of the induced direct-current flux is controlled by the amount of direct current passing through the control windings over conductors 42, which is controlled in turn by the position of the slide arm of controller CR. The current is obviously at its low point when the slide arm is in its uppermost position, and is at its high point when the slide arm is in its lowermost position. The current flow through the windings C1 to C4 may range from zero to about 10 amperes, for example, according to the position of the slide arm of CR.

Figure 2:
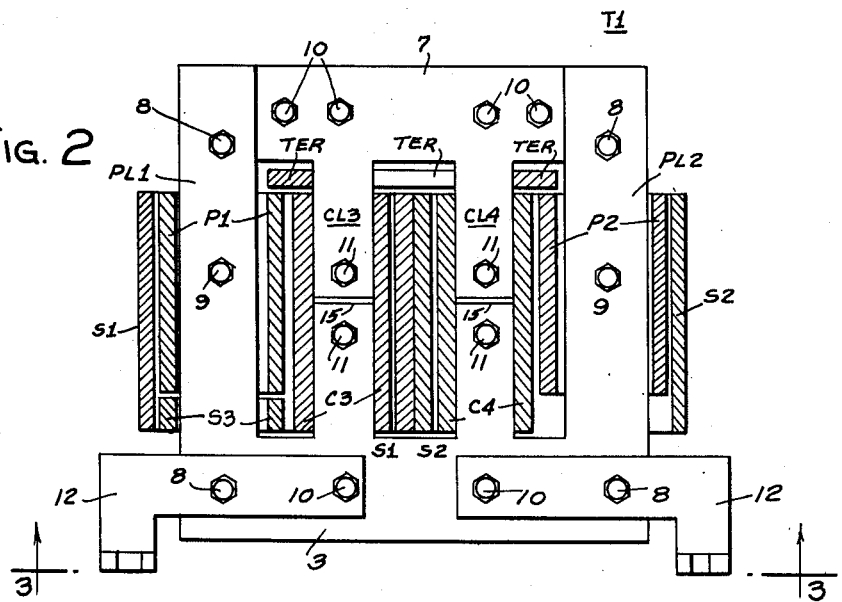
FIG. 2 is a front view of T1 along line 2—2 of FIG. 1, with the windings shown in section.
Figure 3:
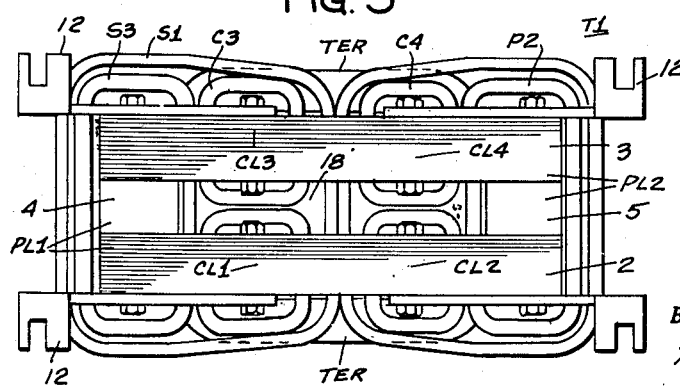
FIG. 3 is a bottom view of T1 along line 3—3 of FIG. 2.
Figure 4:
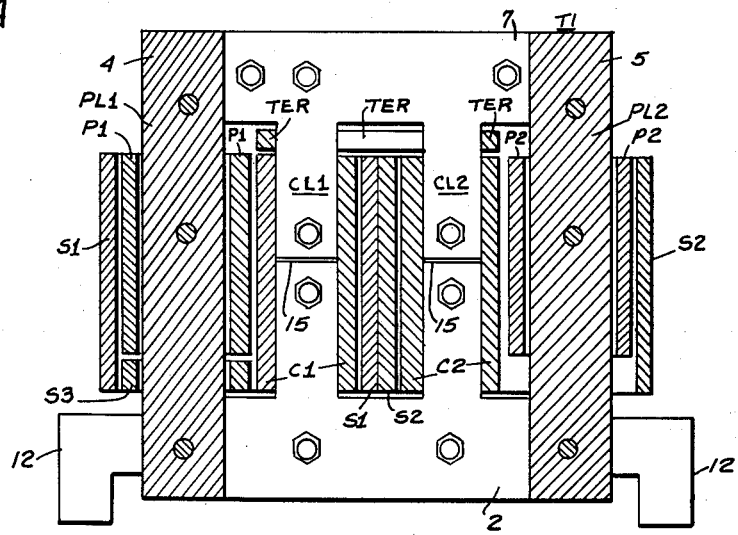
FIG. 4 is a front sectional view of T1 taken generally along line 4—4 of FIG. 2.

It will be observed, that the cross-sectional area of the control legs is somewhat less than the cross-sectional area of the primary legs and of the horizontal interconnecting portions of the transformer core. Accordingly, even when no control current is flowing through coils C1 to C4 when the welding circuit of FIG. 5 is closed (over conductors 43, 46, and 47, upon closure together of electrodes 50 and 51) there is a substantial reluctance within the control legs in addition to the reluctance effect of air gaps 15 therein (FIGS. 2 and 4). This combined control-leg reluctance limits the amount of the noted induced neutralizing flux through the control legs, even with no control current flowing through coils C1 and C4, thereby establishing the noted low point of the high range, at about 40 amperes.

As current is admitted to the control windings C1 to C4, by moving the slider of controller CR downwardly from its uppermost position, the indicated direct-current flux induced in control legs CL1 to CL4 by coils C1 to C4 tends to correspondingly saturate control legs CL1 to CL4, to thus effectively increase the reluctance of each. This increased reluctance requires a correspondingly higher secondary current to drive through the control legs the amount of flux needed to lower the secondary voltage to the voltage drop required across the secondary load. The maximum welding current which can then be passed through the electrodes by way of conductors 43, 46, and 47 is thus increased according to the amount of current through conductors 42 to the control windings of T1. The maximum welding current in the high range may be about 500 amperes when the slide arm of the controller CR is in its lowermost position, wherein maximum direct current passes through the control windings.

The reluctance produced by non-magnetic gaps 15 in legs CL1 to CL4, in addition to acting as described in limiting the neutralizing alternating flux to establish the low point of the high range, is also useful in combating residual tendency of the magnetic material to retain substantial direct-current flux when the control current over 42 is lowered by moving CR from a given point to a lower point within a selected range.

Referring to the rear control legs CL1 and CL2, it will be observed that the direct-current flux through these two legs is up in one leg and down in the other, in series-aiding relationship. As a result, this direct-current flux is caused to circulate locally through the associated rear horizontal connecting portions of the core structure, and thus has almost no tendency to pass through, or saturate, either of the primary legs PL1 and PL2. Similarly, the flux through the front control legs CL3 and CL4 is up in one control leg and down in the other, in series-aiding relationship, similarly substantially confining the direct-current flux from these front control windings to the local portion of the core structure, which excludes the primary legs PL1 and PL2. For these reasons, the noted provision of four direct-current-excited control legs for the illustrated structure of transformer T1, with its two primary legs PL1 and PL2, prevents saturating effect of the direct current in the control windings from occurring adversely in the primary legs.

The alternating-current flux passing through the control legs as described is also prevented from having an adverse effect on the direct-current control circuit by the illustrated connections of the control windings. Considering, for example, the left-hand control legs CL1 and CL3, through which neutralizing flux is driven by secondary current as described, that flux passes in the same direction (either up or down) through both of the legs CL1 and CL3 at the same time. The voltage which is induced in the direct-current control path in either direction through winding C1 is neutralized by an equal and opposite voltage induced in such path through winding C3. Similarly, the voltages induced in windings C2 and C4 by winding S2 are equal and opposite from the standpoint of the direct-current path.

From the foregoing, it will be observed that the direct-current and alternating-current circuits are maintained substantially conjugate with respect to each other in that the flow of alternating current through the primary and secondary windings has substantially no effect on the flow of direct current through the control windings, and the flux induced by the flow of current through the control windings is substantially prevented from traversing the primary legs PL1 and PL2.

It may be noted that a series-parallel connection of windings C1 to C4 to conductors 42 may be substituted for the illustrated full series connection with no adverse effect, so long as the relative directions of control current through the windings C1 to C4 remains unchanged. For example, one branch path across conductors 42 may comprise windings C1 and C3 oppositely connected in series, with a parallel path across conductors 42 including windings C2 and C4 oppositely connected in series and poled as described relative to C1 and C2. Alternatively, one of the two parallel branches could include windings C1 and C4 connected in series in the same sense (rather than oppositely), so long as the other branch includes coils C2 and C3 connected in series and both in the opposite sense with respect to C1 and C4. This latter arrangement is permissible because the neutralizing-flux direction through legs CL1 and CL3 is opposite to the neutralizing-flux direction through CL2 and CL3.

*Intermediate Range—20 to 100 Amperes*

When welding current of an intermediate range, as from 20 to 100 amperes, is desired, arm 33 of range switch 32 is rotated from the terminal of wire 43 to the terminal of wire 44, thereby including the upper section of tertiary winding TER as a choke winding in series between the upper terminal of secondary winding S1 and conductor 46. The inductive action of the included section of winding TER thus reduces the maximum current which can be obtained over conductors 46 and 47, when the electrodes 50 and 51 are in contact, to about 20 amperes for minimum control current and to about 100 amperes for maximum control current over conductors 42. For example, with range switch 32 in its noted intermediate position, and with the slide arm of CR at its uppermost position (for substantially zero current over conductors 42), there is the noted maximum ability of control legs CL1 to CL4 to respond to current flow in the secondary windings by inducing neutralizing flux through CL1 and CL3 in parallel for S1 and oppositely through CL2 and CL4 for S2. At the same time, with no substantial direct-current flux in legs CL1 to CL4, all four of which are encircled by coil TER as shown in FIGS. 1 to 4, TER has a maximum choking effect because of the relatively low-reluctance path provided through TER by the four legs CL1 to CL4 all in parallel. The return path for the choke-induced flux in these control legs is through PL1 and PL2 in parallel.

When the slide arm of CR is progressively lowered toward its position of highest current over conductors 42, the resulting progressive increase in the direct-current flux induced in legs CL1 to CL4 causes the described progressive increase in the effective reluctance of the control legs. Such reluctance increase increases the maximum flow of welding current in two ways. First it correspondingly reduces the capacity of the control legs to divert flux as described in response to the flow of welding current. Second, it correspondingly reduces the choking inductance of the portion of coil TER which is included in the welding circuit. These two additive effects act jointly in controlling the output of current from the welding transformer over the intermediate range of 20 to 100 amperes.

*Low Range—3 to 25 Amperes*

When welding current of a low range, as from 3 to 25 amperes, is required, arm 33 of range switch 32 is rotated to its lower position, wherein it joins output conductor 45 to conductor 46, thereby including both sections of tertiary winding TER in series between the upper terminal of secondary winding S1 and conductor 46. In this position of range switch 32, and with the slide arm of controller CR in its uppermost position to supply minimum current over conductors 42, the full choking effect of all turns of coil TER cooperates with the full neutralizing effect of secondary-induced flux through legs CL1 to CL4 to reduce the maximum output current to its lowest point, 3 amperes for example, thus adapting the welder for welding small and delicate parts without injury. In this low range, as the slide arm of controller CR is progressively lowered, to thereby supply progressively increased control current over conductors 42, the resulting increased saturation of control legs CL1 to CL4 requires greater secondary current to cause neutralizing flux to be driven through these control legs, at the same time reducing the choking effect of coil TER as described. These two conjointly acting effects culminate in a top value (about 25 amperes) of maximum welding current for the low range being reached when maximum control current flows over conductors 42 when the arm of CR is in its lowermost position.

Figure 6:
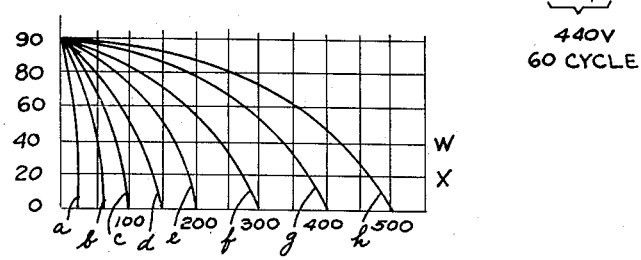
FIG. 6 shows in graphic form the voltage-current relationships of the welding-current output of the system transformer of FIG. 5 for various adjustments *a* to *h* over a current range from a few amperes to 500 amperes.

FIG. 6—*Graphic Illustration*

Referring to FIG. 6, the general relationship between output current and the voltage across electrodes 50 and 51 is indicated by separate curves *a* to *h*. The values along the vertical axis indicate voltage, while the values along the horizontal axis indicate amperage. The two horizontal lines W and X, at about 40 and 20 volts respectively, indicate the usual maximum and minimum arc voltages maintained across the electrodes 50 and 51 during welding. The horizontal zero line indicates the voltage between the electrodes when they are brought into mutual contact preparatory to separation to start the welding arc. Curve *a* represents the voltage-versus-current characteristics of the output circuit at a selected point at about the top of the described low range; curves *b* and *c* fall within the described intermediate range; and curves *d* to *h* fall within the described high range of welding current.

From the values given for the foregoing ranges, it will be observed that there is some overlap between any two adjacent ranges. As a result, curve *a* may lie within the high part of the low range or the low part of the intermediate range; curve *b* lies well within the intermediate range and at the low end of the high range; curve *c* lies just at the top of the intermediate range and in the lower part of the high range; and curves *e* to *h* are all within the noted high range of the welding apparatus.

Figure 7:
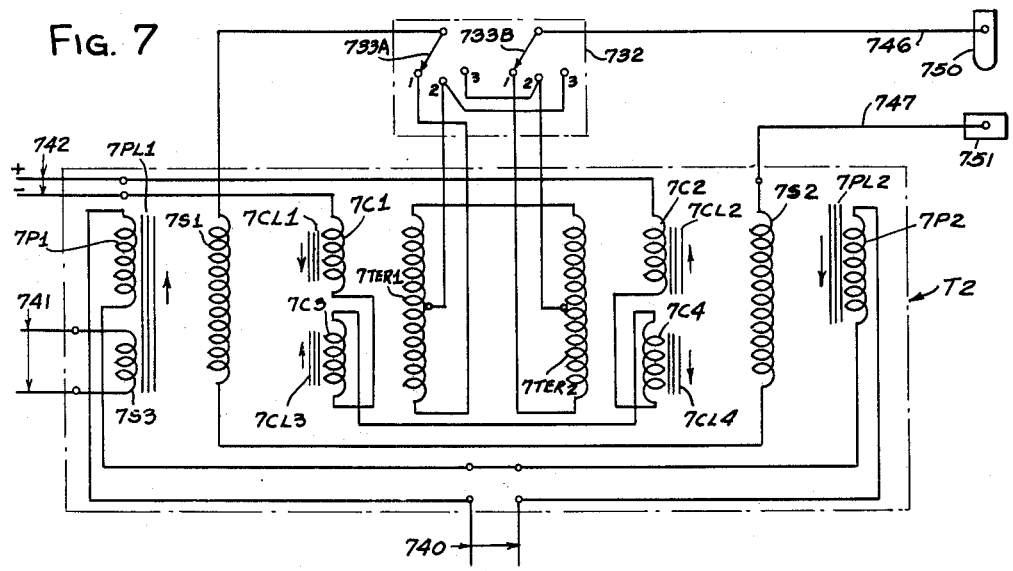
FIG. 7 shows a second embodiment of the welding system employing a second transformer, one wherein the tertiary winding of the first transformer is replaced by two control windings variously connectable in series with the secondary windings.

FIG. 7—*Second Embodiment*

The second embodiment of the welding system, illustrated in FIG. 7, employs a transformer indicated at T2, which may be identical to the transformer T1 of FIGS. 1 to 5 except that the single tertiary winding TER of FIGS. 1 to 5 (which encircles all four choke legs CL1 to CL4) is replaced in FIG. 7 by left and right tertiary windings 7TER1 and 7TER2, each of which encircles only the two associated control legs. Winding 7TER1 surrounds left legs 7CL1 and 7CL3, while 7TER2 surrounds right control legs 7CL2 and 7CL4.

The parts in FIG. 7 which correspond respectively to parts in FIG. 5 have respectively corresponding reference characters applied thereto, but with any such reference character distinguished in FIG. 7 by having the prefix "7." For example, items PL1 and PL2 in FIG. 5 are items 7PL1 and 7PL2 in FIG. 7; and items 40, 41, and 42 in FIG. 5 are items 740, 741, and 742 in FIG. 7. It will be observed that the rectifiers R and controller CR of FIG. 5 are not illustrated in FIG. 7, being there omitted to avoid crowding the drawing. Current is delivered to and from these items by conductor pairs 741 and 742.

The 3-position single-pole range switch 32 of FIG. 5 is replaced in FIG. 7 by 3-position double-pole range switch 732 of which switch arms 733A and 733B are preferably arranged to be operated in unison from one position to another.

While the tertiary winding TER of FIGS. 1 to 5 is employed primarily as a series choke winding, across which welding current of a given value produces a voltage drop according to the amount of direct-current saturation of the four control legs, the tertiary windings 7TER1 and 7TER2 are used primarily to control the secondary voltage according to output current, by aiding or opposing the secondary windings in driving neutralized flux through the control legs.

Low Range of System of FIG. 7

When range switch 732 is set in its first or low-current position, both sections of both tertiary windings 7TER1 and 7TER2 are connected in series in the welding circuit, which includes the serially connected secondary windings 7S1 ad 7S2, arms 733A and 733B of range switch 732 in their illustrated first position, welding leads 746 and 747, and electrodes 750 and 751. When the welding circuit is closed (assuming no direct current, through control windings 7C1 to 7C4 from direct-current control leads 742), the flow of welding current through secondary windings 7S1 and 7S2 causes each of them to drive neutralizing flux through its associated pair of control legs, thereby limiting secondary current by reducing the secondary voltage as explained for the system of FIG. 5. This action of the secondary windings is aided by windings 7TER1 and 7TER2, which are now aidingly connected in the welding circuit for that purpose. For example, considering the welding current as pasisng upwardly through secondary winding 7S1, it passes thence through switch arm 733A in its illustrated first position, and upwardly through both sections of tertiary winding 7TER1, causing windings 7S1 and 7TER1 to act cumulatively in inducing neutralizing flux through 7CL1 and 7CL3.

Under the same assumption, the welding current passes downwardly through both sections of winding 7TER2, and thence through switch arm 733B in its illustrated first position, conductor 746, electrodes 750 and 751, conductor 747, and thence downwardly through winding 7S2 to winding 7S1. The downward flow through tertiary winding 7TER1 aids the downward flow through secondary winding 7S1 in driving neutralizing flux through control legs 7CL1 and 7CL3.

As a result of the described aiding action of windings 7TER1 and 7S1 and of 7TER2 and 7S2, the welding current is held to a very small value, such as 3 amperes.

When controlling direct current is supplied, over leads 742, as described for the system of FIG. 5, windings 7C1 to 7C4 are correspondingly energized by direct current to correspondingly saturate control legs 7CL1 to 7CL4. The reluctance of these legs is thereby increased, thereby reducing the amount of the neutralizing flux driven through these legs by the described joint action of winding 7TER1 with winding 7S1 and of 7TER2 with 7S2. If about the same amount of direct-current saturation of the control legs is employed as for the system of FIG. 5, the low range of the system of FIG. 7 may extend from 3 to 100 amperes, rather than from 3 to 25 amperes for FIG. 5.

Intermediate Range of System of FIG. 7

The system of FIG. 7 may be set for an intermediate current range by moving the arms 733A and 733B of range switch 732 into their second or intermediate position, thereby disconnecting and bypassing the lower section of each of the tertiary windings 7TER1 and 7TER2, leaving the upper section of each of these windings connected in the same relative direction in the welding circuit as described for the low-range setting of 732. The described action of windings 7TER1 and 7TER2, in aiding the respective secondary windings 7S1 and 7S2 in driving neutralizing flux, is as described for the low range, but is substanitally reduced because of the reduced number of turns of the tertiary windings now included in the path of the welding current. As a conseqence, employing desired portions of the noted amount of control-leg saturation by direct current over conductor 742, the intermediate range in FIG. 7 may be from a low value of about 20 amperes to a high value of about 250 amperes.

High Range of System of FIG. 7

The system of FIG. 7 is set into its high range by operating range switch 732 to move arms 733A and 733B to third position. In that position, welding current flows through the upper section only of windings 7TER1 and 7TER2, but flows in the opposite direction through each such section with respect to the direction of current flow in the associated secondary windings. For example, assuming the momentary direction of current flow to be up in winding 7S1 and down in winding 7S2, the current flow from the upper terminal of 7S1 is through arm 733A in its third position, and thence upwardly through the upper section of 7TER2, downwardly through the upper section of 7TER1, and thence through arm 733B in its third position to and through the welding electrodes. Accordingly, the upper section of winding 7TER1 opposes the described action of its associated secondary winding 7S1, and the upper section of 7TER2 opposes the described action of 7S2, in driving neutralizing flux through the associated control legs. As a consequence, the current flow in the high range of the system of FIG. 7 may be 150 amperes with no current flowing through direct-current control leads 742, and may be increased, as direct current is caused to flow through these leads, up to any desired high-current value, such as 400 amperes.

In summation, the low-current and high-current values, in amperes, of the described low, intermediate, and high ranges of the system of FIG. 7, may be as shown in the following table:

| Range | Low current | High current |
| --- | --- | --- |
| Low | 3 | 100 |
| Int | 20 | 250 |
| High | 150 | 400 |

FIGS. 8 to 11—Third Embodiment

Figure 8:
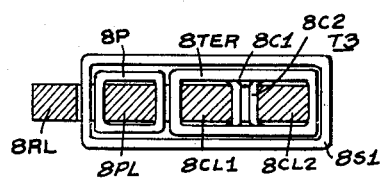
FIGS. 8 and 9 show a third transformer for use in a third embodiment of the invention.
Figure 9:
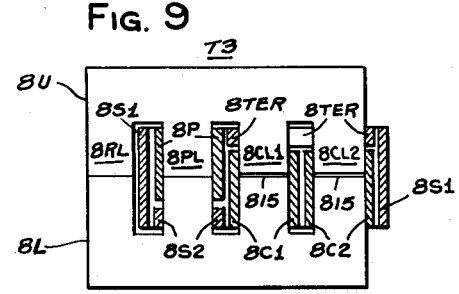

Referring to the modified transformer T3 of FIGS. 8 and 9 and to the modified system (FIG. 10) in which it is incorporated, the core structure of T3 comprises an upper section 8U and a lower section 8L as shown in FIG. 9 wherein the sections are assembled in vertical alignment to provide four vertical legs in a row, comprising return leg 8RL, primary leg 8PL, and control legs 8CL1 and 8CL2. Gaps 815 may be provided in the control legs for the purpose described for gaps 15 of the structure of FIGS. 1 to 4.

The windings of T3 comprise primary winding 8P and local secondary winding 8S2 encircling leg 8P1; secondary winding 8S1 encircling primary leg 8PL and control legs 8CL1 and 8CL2; direct-current control windings 8C1 and 8C2 encircling control legs 8CL1 and 8CL2 respectively; and tertiary winding 8TER encircling both control legs 8CL1 and 8CL2.

Figure 10:
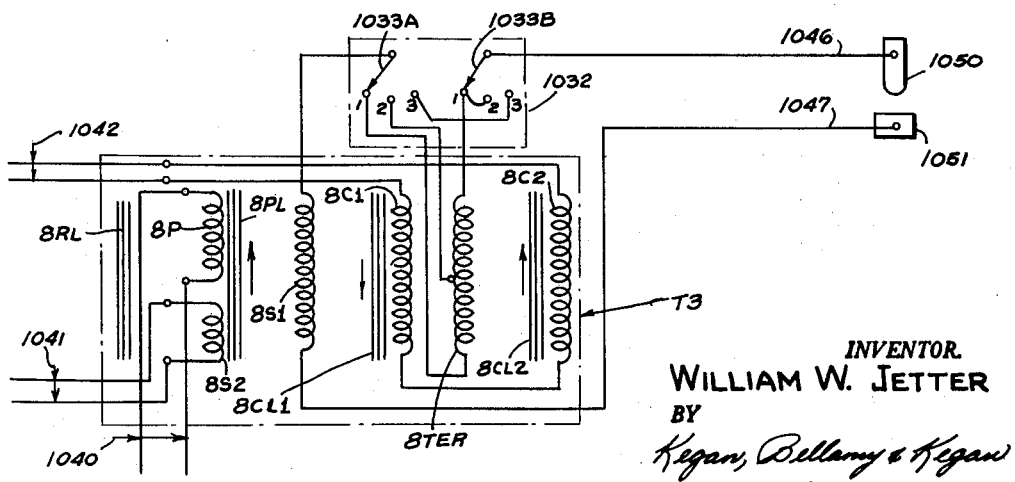
FIG. 10 shows, in circuit diagram, a welding system incorporating a transformer according to FIGS. 8 and 9.

Transformer T3 is employed in the welding system as shown in FIG. 10, where conductor pairs 1040 to 1042 correspond respectively to conductor pairs 740 to 742 of FIG. 7; range switch 1032 and its illustrated arms correspond to range switch 732 and its illustrated arms of FIG. 7; and conductors 1046, 1047 and electrodes 1050, 1051 correspond respectively to items 746, 747 and 750, 751 of FIG. 7.

Normally, substantially all of the flux induced in primary leg 8PL may return freely through return leg 8RL.

With the range switch 1032 set in its illustrated low position and with the welding circuit closed at 1050, 1051, assuming the momentary direction of current flow to be upwardly through secondary leg 8S1, it continues thence through switch arm 1033A in position 1, upwardly through secondary winding 8TER, and thence to and through the welding electrodes by way of switch arm 1033B. At this time, as explained in connection with FIG. 7 for windings 7S1, 7TER1, and control legs 7CL1, 7CL3, secondary winding 8S1 induces flux through both of the control legs 8CL1 and 8CL2, which it encircles. That action is assisted by tertiary winding 8TER acting with the second winding in the traced circuit path. This action of windings 8S1 and 8TER holds the closed circuit current flow down to a desired low value when no direct current is flowing, which value is increased directly with the amount of direct current traversing direct-current conductors 1042 and control windings 8C1 and 8C2.

The limits of the control current in any range setting of the system of FIG. 10 may be as described for the system of FIG. 10.

When the range switch 1032 is set in its intermediate position, the switch arms 1033A and 1033B are moved from their low position 1 to their intermediate position 2. Thereby, the lower section of winding 8TER is open-circuited and by-passed to leave only the upper section of this winding in the welding circuit to assist the described action of current through secondary winding 8S1 in driving neutralizing flux through the control legs of T3.

When the range switch 1032 is actuated to place its arms 1033A and 1033B in their high-range third position, the winding 8TER is shorted out of the welding circuit (see FIG. 10). An alternate operation (illustrated in FIG. 11) may be achieved by a slight modification of the described wiring, such as by removing the illustrated wire connecting points 3—3 and substituting a wire connecting point 2 associated with arm 1033A with point 3 associated with arm 1033B and inserting another wire connecting point 3 associated with arm 1033A with point 1 associated with arm 1033B, such that the upper section of winding 8TER is connected serially in the welding circuit, but is reversely connected with respect to secondary winding 8S1, in that (for example) an upward flow of welding current through 8S1 passes through arm 1033A in third position, and thence downwardly through the upper section of winding 8TER, and thence through arm 1033B in its third position, to the welding electrodes. Then, increased welding current flows for any given direct current through the control windings, since the reversely connected upper section of winding 8TER opposes the action of 8S1 in driving neutralizing flux through 8CL1 and 8CL2.

Attention is called to the fact that, (1) whereas the description in the cited parent application proceeds on the theory that the alternating flux driven through the control legs, to correspondingly reduce the welding current to a desired value, comprises primary-induced flux diverted through the control legs from its normal path, (2) the foregoing description states merely that such alternating flux as is induced to traverse the control legs (considered from the standpoint of the associated secondary winding which surrounds both a primary leg and the associated secondary legs) neutralizes a corresponding portion of the primary flux. The description herein is intended to apply equally (1) to the foregoing common theory of flux distribution in multipath magnetic circuits, and (2) to common alternative theories or assumptions such as are adopted in mathematical solution of flux-strength problems.

From the foregoing description of the operation of the system of FIGS. 7 and 10 or 11, it is evident that the described variable connection of tertiary winding 7TER1 or 7TER2 of FIG. 7, or of tertiary winding 8TER of FIG. 10 or 11, into the welding circuit acts to vary the net amount of, or the portion of, the primary-leg flux which effectively links the primary and secondary windings when welding current is drawn, while leaving the open-circuit voltage unaffected, and that it does this by acting variably with or against the action of the secondary winding to drive neutralizing flux through the associated control legs.

While I have described above the principles of my invention in connection with specific apparatus, it is to be clearly understood that this description is made only by way of example and not as a limitation to the scope of my invention.

I claim:

1. A welding system comprising a transformer having a core structure which provides two similar sets of legs, with each leg extending between two leg-connecting portions of the core structure, each set of legs including a primary leg and two control legs adjacent thereto, primary windings encircling the respective primary legs and arranged to induce alternating primary flux through the two primary legs in series-aiding relationship by way of the leg-connecting structure, separate secondary windings for the two sets of legs, each secondary winding encircling all three legs of its set in common, whereby it is effectively linked by flux from its associated primary leg which returns through the other primary leg but not by such of that flux which is diverted through the control legs encircled by such secondary winding, a welding circuit energized by current supplied jointly by the secondary windings, the flow of welding current in either secondary winding tending to drive flux through the associated control legs in series-aiding relationship to the primary flux from the associated primary leg, thereby tending to divert such primary flux from returning effectively through the other primary leg, the maximum value of current in the welding circuit being limited by such diversion of primary flux, means for controlling the portion of primary flux diverted through the control legs for any given secondary current, comprising control windings encircling the respective control legs, and means including a direct-current circuit for sending an adjustable flow of direct current through the control windings of a strength inversely according to the portion of primary flux to be diverted.

2. A welding system according to claim 1, wherein the said control windings are so connected relatively in the said direct-current circuit that the direct-current flux through either said control leg of either said set of legs agrees in direction with the direct-current flux through one control leg of the other said set of legs and is opposite in direction to the direct-current flux through the other control leg of the last said set of legs, whereby the direct-current flux tends to be limited to the said control legs and their connecting portions of the core structure and to be excluded from the primary legs, and the current-inducing effects of the diverted flux upon the said control windings tends to be cancelled out of the said direct-current circuit.

3. A welding system according to claim 2, wherein at least two of the said control windings are connected in series with each other in the direct-current circuit and are connected in series-opposing relationship from the standpoint of alternating-current induction by the said diverted flux.

4. A welding system according to claim 1, wherein the said leg-connecting portions of the said core structure comprise an upper portion and a lower portion, with each such portion further comprising a front and a rearwardly displaced rear sub-portion, both sub-portions of each said portion connecting with an end of each primary leg, the control legs of each said set comprising a front leg extending between the said front sub-portions and a rear leg extending between the said rear sub-portions, with space between such front and rear legs to accommodate their said control windings.

5. A welding system according to claim 4, wherein the said control windings are so interrelated in the said direct-current circuit that the direct-current flux is upwardly in one control leg of either of said set of legs and is downwardly in the other control leg of the same set, and is upwardly in one control leg between either the front or the rear ones of said sub-portions and is downwardly in the other control leg extending between the same sub-portions.

6. In a welding system according to claim 1, a choke winding encircling the said control legs in common, and circuit means including the choke winding serially in the said welding circuit, adjustment of the said flow of direct current through the said control winding serving to regulate the parallel reluctance of the control legs, which acts to control the flow of welding current by controlling the effective potential across the said secondary windings and also by controlling the reactance of the choke winding.

7. A welding system according to claim 6, wherein the said welding circuit includes a range switch adjustable to include the choke winding in the welding circuit to provide a lower range of welding-current values, and to exclude the choke winding to provide a higher range of welding-current values.

8. A welding system according to claim 7, wherein the said range switch is adjustable to include only a part of the said choke winding in the said welding circuit to provide an intermediate range of welding-current values.

9. In a welding system comprising a welding circuit and means for supplying alternating welding current thereover, core structure having at least two control legs and at least one return leg magnetically interconnected in series with both control legs in common, a choke winding encircling both control legs in common, circuit means for including the choke winding serially in the welding circuit to provide series reactance therein, means for adjusting the series reactance offered by the choke winding comprising control windings respectively encircling the control legs, and a direct-current circuit for sending an adjustable flow of direct current through the control legs of a strength inversely according to the desired reactance, the control windings being oppositely connected in the direct-current circuit to cancel therein the inductive effect of alternating current through the choke winding.

10. A welding system according to claim 9, wherein the said core structure comprises a portion of a welding transformer for supplying the said welding current to the said welding circuit, the said core structure including a primary leg interconnected magnetically in parallel with the said return and control legs, a primary winding surrounding the primary leg to induce alternating primary flux therein, a variable portion of the primary flux returning through the said control legs in parallel inversely according to the strength of current in the said direct current circuit, with the variable remainder returning through the said return leg, and a secondary winding for the transformer for variably energizing the welding circuit directly according to the strength of current in the direct-current circuit, the secondary winding surrounding at least one said leg and being effectively coupled to the primary leg by that portion of the primary flux which traverses the said return leg.

11. A welding system comprising an alternating-current welding circuit and means for sending an adjustable alternating current therethrough, comprising a transformer having a core structure providing at least three parallel magnetic paths which comprise a primary path, a return path, and a control path, a primary winding encircling the primary path, a secondary winding included in the welding circuit and inductively coupled to the core structure according to the difference between the flux traversing the primary path and the control path, a tertiary winding encircling the control path only, and switching means for variably including the tertiary winding in the alternating-current welding circuit whereby the control path is variably saturated with flux induced by the alternating current tertiary winding thereby to correspondingly control the said difference between the flux traversing the primary path and the control path and thus to correspondingly control the flow of alternating current in the welding circuit.

12. A welding system according to claim 11, wherein the said tertiary winding is tapped, and the said switching means includes means for selectively connecting the said welding circuit to the taps of the tertiary winding to include corresponding portions of the tertiary winding in the welding circuit and to exclude at least one such portion therefrom.

13. A welding system comprising an alternating-current welding circuit and means for sending an adjustable alternating current therethrough, comprising a transformer having a core structure providing at least three parallel magnetic paths which comprise a primary path, a return path, and a control path, a primary winding encircling the primary path, a secondary winding included in the welding circuit and inductively coupled to the core structure according to the difference between the flux traversing the primary path and the control path, a tertiary winding encircling the control path, and switching means for variably including the tertiary winding in the alternating-current welding circuit to correspondingly control the flow of alternating current in the welding circuit wherein the said switching means comprises means for connecting at least a portion of said tertiary winding in the said welding circuit in either selected one of two directions with respect to current flow in the welding circuit.

14. A welding system comprising a welding circuit and means for sending an adjustable current therethrough, comprising a transformer having a core structure providing at least three parallel magnetic paths which comprise a primary path, a return path, and a control path, a primary winding encircling the primary path, a secondary winding included in the welding circuit and inductively coupled to the core structure according to the difference between the flux traversing the primary path and the control path, a tertiary winding encircling the control path, and switching means for variably including the tertiary winding in the welding circuit to correspondingly control the flow of current in the welding circuit, said tertiary winding including first and second portions, and the said switching means comprising means for connecting both the first and the second winding portions serially in the welding circuit, both in a given direction with respect to current flow in the welding circuit, for connecting the second winding portion alone in said given direction, and for connecting the second portion alone in a direction opposite to said given direction.

15. A welding system comprising an alternating-current welding circuit and means for sending an adjustable alternating current therethrough, comprising a transformer having a core structure providing at least three parallel magnetic paths which comprise a primary path, a return path, and a control path, a primary winding encircling the primary path, a secondary winding included in the welding circuit and inductively coupled to the core structure according to the difference between the flux traversing the primary path and the control path, a tertiary winding encircling the control path, and switching means for variably including the tertiary winding in the alternating-current welding circuit to correspondingly control the flow of alternating current in the welding circuit wherein the said switching means comprises a range switch which establishes respective ranges of current-flow in the said welding circuit, additional means operable in each said range to establish any desired one of a plurality of current-flow values in the established range, the said additional means comprising means for varying the average reluctance of the said control path.

16. A welding system comprising an alternating-current welding circuit and means for sending an adjustable alternating current therethrough, comprising a transformer having a core structure providing at least three parallel magnetic paths which comprise a primary path, a return path, and a control path, a primary winding encircling the primary path, a secondary winding included in the welding circuit and inductively coupled to the core structure according to the difference between the flux traversing the primary path and the control path, a tertiary winding encircling the control path, and switching means for variably including the tertiary winding in the alternating-current welding circuit to correspondingly control the flow of alternating current in the welding circuit, wherein the said secondary winding encircles both the said primary path and the said control path, control means coacting with said switching means and said tertiary winding in controlling current flow in the said welding circuit, comprising means for controlling the average reluctance of said control path, the last said means including winding means inductively coupled to the control path and direct-current means for variably energizing the winding means.

17. A welding system comprising an alternating current welding circuit and means for sending an adjustable alternating current therethrough, comprising a transformer having a core structure providing four parallel magnetic paths which comprise two primary paths and two control paths associated respectively with the primary paths, primary windings encircling the primary paths respectively and arranged to drive flux through the primary paths in series secondary windings included serially in the alternating current welding circuit to drive alternating welding current therethrough, each secondary winding encircling a separate primary path in common with its associated control path, two serially related tertiary windings for inclusion in the alternating current welding circuit in series with the secondary windings, the tertiary windings respectively encircling the control paths only, and switching means for variably including the serially related teritary windings in the alternating welding circuit to correspondingly control the flow of alternating current therein by correspondingly controlling the portion of the flux in each primary path which returns through the associated control path rather than by way of the other primary path.

18. A welding system comprising a welding circuit and means for sending an adjustable current therethrough, comprising a transformer having a core structure providing four parallel magnetic paths which comprise two primary paths and two control paths associated respectively with the primary paths, primary windings encircling the primary paths respectively and arranged to drive flux through the primary paths in series, secondary windings included serially in the welding circuit to drive welding current therethrough, each secondary winding encircling a separate primary path in common with its associated control path, two serially related tertiary windings for inclusion in the welding circuit in series with the secondary windings, the tertiary windings encircling the control paths respectively, and switching means for variably including the serially related tertiary windings in the welding circuit to correspondingly control the flow of current therein by correspondingly controlling the portion of the flux in each primary path which returns through the associated control path rather than by way of the other primary path, wherein the said switching means includes means for connecting at least a portion of each of the said serially related tertiary windings serially in the said welding circuit in either selected one of two directions with respect to current flow through the secondary windings.

19. A welding system for welding with alternating current comprising a transformer having a core structure which provides two similar sets of legs, with each set extending between the same two leg-connecting portions of the core structure, each set of legs including a primary leg and as associated control leg, primary windings encircling the respective primary legs to induce alternating primary flux through the two primary legs in series-aiding relationship by way of the leg-connecting structure, separate secondary windings for the two sets of legs, each secondary winding encircling both legs of its set in common, whereby it is effectively linked by flux from its associated primary leg which returns through the other primary leg but not by such flux as returns through the control leg encircled by such secondary winding and whereby an alternating current is induced in either of said secondary windings, the flow of alternating welding current in either secondary winding tending to cause primary flux in the associated primary leg to return idly through the associated control leg rather than through the other primary leg, thereby correspondingly limiting the flow of alternating welding current, and means for controlling the portion of primary flux diverted through the control legs responsive to a given flow of alternating welding current through the secondary windings, comprising serially related tertiary windings encircling the respective control legs only, and switching means for variably including the tertiary windings in series with the secondary windings, whereby they correspondingly control flux diversion through the control legs.

References Cited in the file of this patent

UNITED STATES PATENTS

| | | |
|---|---|---|
| 1,810,251 | Musto | June 16, 1931 |
| 2,464,679 | Fletcher | Mar. 15, 1949 |
| 2,591,582 | Monette | Apr. 1, 1952 |